United States Patent
Ishibashi et al.

(10) Patent No.: US 8,133,344 B2
(45) Date of Patent: Mar. 13, 2012

(54) PROCESS FOR PRODUCTION OF HOLLOW-FIBER MEMBRANE BUNDLES

(75) Inventors: Yuzuru Ishibashi, Tokyo (JP); Akihiro Watanabe, Tokyo (JP)

(73) Assignee: Asahi Kasei Chemicals Corporation, Tokyo (JP)

( * ) Notice: Subject to any disclaimer, the term of this patent is extended or adjusted under 35 U.S.C. 154(b) by 155 days.

(21) Appl. No.: 12/307,983

(22) PCT Filed: Jul. 5, 2007

(86) PCT No.: PCT/JP2007/063472
§ 371 (c)(1),
(2), (4) Date: Jul. 10, 2009

(87) PCT Pub. No.: WO2008/007608
PCT Pub. Date: Jan. 17, 2008

(65) Prior Publication Data
US 2010/0000939 A1    Jan. 7, 2010

(30) Foreign Application Priority Data
Jul. 10, 2006   (JP) .................................. 2006-189060

(51) Int. Cl.
*B29C 65/00* (2006.01)
*B29C 45/14* (2006.01)
*B01D 63/00* (2006.01)
*C02F 24/00* (2006.01)

(52) U.S. Cl. ............... 156/296; 210/321.8; 210/321.88; 264/275; 264/DIG. 48; 156/293

(58) Field of Classification Search .... 210/321.8–321.9, 210/650–652, 500.23; 264/DIG. 8, DIG. 48, 264/275; 156/293, 296
See application file for complete search history.

(56) References Cited

U.S. PATENT DOCUMENTS

| 3,730,959 | A |   | 5/1973  | Horres, Jr. |
| 4,025,436 | A | * | 5/1977  | Tsuda et al. ............... 210/321.8 |
| 4,784,768 | A | * | 11/1988 | Mathieu ..................... 210/321.8 |
| 4,961,464 | A | * | 10/1990 | Wollbeck et al. ............... 165/83 |

(Continued)

FOREIGN PATENT DOCUMENTS

CA        1 191 767      8/1985

(Continued)

OTHER PUBLICATIONS

Supplementary European Search Report dated Jun. 7, 2011 issued in a corresponding European patent application.

*Primary Examiner* — Ana M Fortuna
(74) *Attorney, Agent, or Firm* — Finnegan, Henderson, Farabow, Garrett & Dunner, L.L.P.

(57) ABSTRACT

The present invention relates to a method of producing a hollow fiber membrane bundle having an end fixed with a casting material wherein the ends of hollow fiber membranes are fixed with the casting material in a condition that an insert is placed inside a hollow fiber membrane bundle at a position inner than a region where a fixing portion is formed, and then the insert is removed from the inside of the hollow fiber membrane bundle; and relates to a method of producing a hollow fiber membrane filter element through this method. The hollow fiber membrane bundle produced by the method of the present invention can be used in various types of filtration treatment such as external pressure filtration.

9 Claims, 6 Drawing Sheets

U.S. PATENT DOCUMENTS

| | | | |
|---|---|---|---|
| 5,174,900 A * | 12/1992 | Nichols et al. | 210/651 |
| 5,622,857 A * | 4/1997 | Goffe | 435/378 |
| 5,622,859 A * | 4/1997 | Iritani et al. | 435/252.1 |
| 5,690,823 A * | 11/1997 | Reipur et al. | 210/321.8 |
| 5,846,427 A * | 12/1998 | Kessler et al. | 210/645 |
| 6,663,745 B1 * | 12/2003 | Cheng et al. | 156/293 |
| 7,160,455 B2 * | 1/2007 | Taniguchi et al. | 210/321.88 |
| 7,172,696 B1 * | 2/2007 | Martinez et al. | 210/321.81 |
| 7,922,902 B2 * | 4/2011 | Watari et al. | 210/257.2 |
| 7,931,805 B2 * | 4/2011 | Schafer et al. | 210/321.78 |

FOREIGN PATENT DOCUMENTS

| | | |
|---|---|---|
| JP | 63-69509 | 3/1988 |
| JP | 63-168004 | 7/1988 |
| JP | 63-171607 | 7/1988 |
| JP | 6-55038 | 3/1994 |
| JP | 6-327905 | 11/1994 |
| JP | 10-174835 | 6/1998 |
| JP | 2000-157846 | 6/2000 |
| JP | 2003-164736 | 6/2003 |
| JP | 2005-296937 | 10/2005 |

* cited by examiner a b c d e f g

PROCESS FOR PRODUCTION OF HOLLOW-FIBER MEMBRANE BUNDLES

CROSS REFERENCE TO RELATED APPLICATIONS

This application is a National Phase application based on PCT/JP2007/063472 filed on Jul. 5, 2007, and claims the priority of Japanese Application No. 2006-189060, filed Jul. 10, 2006, the content of both of which is incorporated herein by reference.

TECHNICAL FIELD

The present invention relates to a method of producing a hollow fiber membrane bundle that is used in a hollow fiber membrane filter element and a hollow fiber membrane bundle produced by the method, and relates to a method of producing a filter element including the hollow fiber membrane bundle and a filter element produced by the method.

BACKGROUND ART

In a membrane separation process for activated sludge, which is one of processes of wastewater, a membrane filter element is immersed in an activated-sludge tank and activated sludge is separated by filtration. In this process, the filtration can be carried out at a significantly high concentration of mixed liquor suspended solid (MLSS) of 5000 to 20000 mg/L. Accordingly, the process has advantages in that the volume of the activated-sludge tank can be reduced or the time for reaction conducted in the activated-sludge tank can be shortened. In addition, since the filtration is carried out through a membrane, a final settlement tank for removing suspended solids (SS) from treated water is unnecessary. Furthermore, since the filtration can be carried out regardless of sedimentation properties of activated sludge, no special countermeasure is necessary even if the sedimentation properties of activated sludge are poor. Thus, the membrane separation process has many advantages compared to sedimentation processes and, therefore, has been rapidly developed recently.

DISCLOSURE OF THE INVENTION

Problems to be Solved by the Invention

Hollow fiber membranes themselves have high strength and can be therefore used for a long period of time with less damage in the membrane surfaces, such damage is caused by contact of foreign substances in raw water with the membranes. Furthermore, the hollow fiber membranes have an advantage in that extraneous substances can be removed from the membrane surfaces by ejecting, for example, treatment water from the direction opposite to the filtration direction (backwashing). However, activated sludge, flocculated sludge, and foreign substances accumulate on the surfaces of the hollow fiber membranes or between the membranes. Therefore, the effective membrane area is decreased if this accumulation is not removed during the filtration, resulting in a decrease in filtration ability. Thus, there is a problem that stable filtration for a long period of time cannot be achieved.

In order to avoid the accumulation of sludge and other substances on the hollow fiber membranes, the membranes are vibrated by aerating the membrane filter element from the bottom, or water passing between the membranes is agitated by feeding air bubbles upward. For example, Patent Document 1 describes a method using a hollow fiber membrane filter element having a lower ring at a lower part of the filter element and a fixing portion with a plurality of through-holes on the lower ring side. This filter element is aerated from the lower ring side to form a gas puddle in the end of the lower ring and to generate uniform air bubbles through these through-holes, so that the sludge and other substances are easily exfoliated. However, even if such membranes are used, it is desired to reduce the number of the hollow fiber membranes to an appropriate filling rate in order to avoid adhesion of dirt for carrying out filtration for a longer time.

When a hollow fiber membrane filter element has a low membrane filling rate, the hollow fiber membrane bundles are unevenly distributed, resulting in a difficulty in uniform distribution at the end of a fixed portion (hereinafter, referred to as "end fixing portion") of the hollow fiber membranes. Sludge and other substances easily accumulate at a portion where the hollow fiber membranes are unevenly distributed. In addition, in a filter element having through-holes in the fixing layer at the lower ring side, the through-holes are exposed to the outside of the hollow fiber membrane bundle and thereby the aeration air flows out to the outside of the hollow fiber membranes during filtration treatment. Therefore, the effect is insufficient for discharging flocculated activated sludge and foreign substances to the outside of the hollow fiber membrane bundle. As a result, larger amounts of flocculated activated sludge and the foreign substances accumulate in the hollow fiber membrane bundle of the hollow fiber membrane filter element to cause a problem of clogging of the hollow fiber membrane surfaces.

In a method that is proposed for producing a hollow fiber membrane filter element having a low membrane filling rate, a large number of hollow fiber membranes are thinly disposed and are wound up together with a reticulated insert into a rolled drainboard, and the ends, including that of the insert, are fixed (Patent Document 2). It is also proposed that an insert such as space yarn is disposed between hollow fiber membranes in order to prevent raw water from drifting in the hollow fiber membranes (Patent Document 3). However, in these methods, since the insert is present between the hollow fiber membranes that exhibit a filtration function, the shaking of the membranes by an upward flow of air bubbles is inhibited to significantly decrease the effect of discharging flocculated activated sludge and foreign substances to the outside of the hollow fiber membrane bundle, which is a disadvantage.

Patent Document 1: Japanese Unexamined Patent Application Publication No. 2000-157846
Patent Document 2: Japanese Unexamined Patent Application Publication No. 06-55083
Patent Document 3: Japanese Unexamined Patent Application Publication No. 06-327905

It is an object of the present invention to provide a method of producing a hollow fiber membrane bundle wherein the ends of hollow fiber membranes are evenly disposed and fixed even at a low membrane filling rate.

Means for Solving the Problems

The inventors have conducted intensive studies and, as a result, have found that the above-mentioned problems can be solved by disposing an insert inside a hollow fiber membrane bundle, fixing the ends of the hollow fiber membranes, and then removing the insert from the inside of the hollow fiber membrane bundle. Thus, the present invention has been achieved. That is, the present invention includes the following aspects:

(1) A method of producing a hollow fiber membrane bundle having a fixed end, including placing an insert inside a hollow fiber membrane bundle at a position inner than a region to be fixed; fixing the ends of the hollow fiber membranes; and then removing the insert from the inside of the hollow fiber membrane bundle;
(2) The method of producing a hollow fiber membrane bundle according to aspect (1), wherein the insert has an apparent density of 1 g/cm$^3$ or less;
(3) The method of producing a hollow fiber membrane bundle according to aspect (1), wherein the insert has an apparent density of 0.1 g/cm$^3$ or less;
(4) The method of producing a hollow fiber membrane bundle according to any of aspects (1) to (3), wherein the insert is a hollow material;
(5) The method of producing a hollow fiber membrane bundle according to aspect (4), wherein the insert is a foam;
(6) The method of producing a hollow fiber membrane bundle according to aspect (4), wherein the insert is a balloon inflated with a gas and/or a liquid;
(7) The method of producing a hollow fiber membrane bundle according to any of aspects (1) to (6), wherein the insert has a shape of a sphere, a cylinder, or a polygonal column;
(8) The method of producing a hollow fiber membrane bundle according to any of aspects (1) to (6), wherein the insert has a shape of which a cross-section perpendicular to the major axis is circular, ellipsoidal, or polygonal and has a circle-equivalent diameter decreasing from the center toward one or both of the ends along the major axis;
(9) The method of producing a hollow fiber membrane bundle according to any of aspects (1) to (8), wherein the insert comprises a thermoplastic resin or rubber;
(10) The method of producing a hollow fiber membrane bundle according to any of aspects (1) to (9), wherein the regions for fixing the ends have through-holes on one side;
(11) The method of producing a hollow fiber membrane bundle according to any of aspects (1) to (10), wherein a membrane filling rate at an interface inner than the end fixing portion of the hollow fiber membranes is in the range of 5 to 40%;
(12) A method of producing a hollow fiber membrane bundle having a fixed end, including placing an insert having an apparent density of 0.1 g/cm$^3$ or less inside a hollow fiber membrane bundle at a position inner than a region to be fixed; fixing the ends of the hollow fiber membranes by injecting a casting material to the ends of the hollow fiber membranes by a centrifugal force and hardening the casting material; and then removing the insert from the inside of the hollow fiber membrane bundle;
(13) A hollow fiber membrane bundle having a fixed end produced by the method according to any of aspects (1) to (12);
(14) A method of producing a hollow fiber membrane filter element, including the step of disposing a hollow fiber membrane bundle in a surrounding member for the end fixing portion or an external cylinder, in the method of producing the hollow fiber membrane bundle having a fixed end according to any of aspects (1) to (9); and
(15) A hollow fiber membrane filter element produced by the method according to aspect (14).

Effects of the Invention

According to the method of the present invention, a hollow fiber membrane bundle including hollow fiber membranes evenly distributed at the end fixing portion can be readily produced even at a low membrane filling rate. Furthermore, even in the case that the hollow fiber membrane bundle has through-holes at one ends of the membranes, the through-holes are not exposed to the outside of the membrane bundle. Consequently, the hollow fiber membrane bundle can efficiently discharge sludge and other substances to the outside of the hollow fiber membrane bundle when it is used in a membrane separation activated-sludge process. This ensures stable filtration operation for a long time.

BEST MODES FOR CARRYING OUT THE INVENTION

In the hollow fiber membrane bundle produced by the method of the present invention, a plurality of hollow fiber membranes is fixed at at least one end, and the hollow portions open at least one end faces of the hollow fiber membranes.

Figure 1:
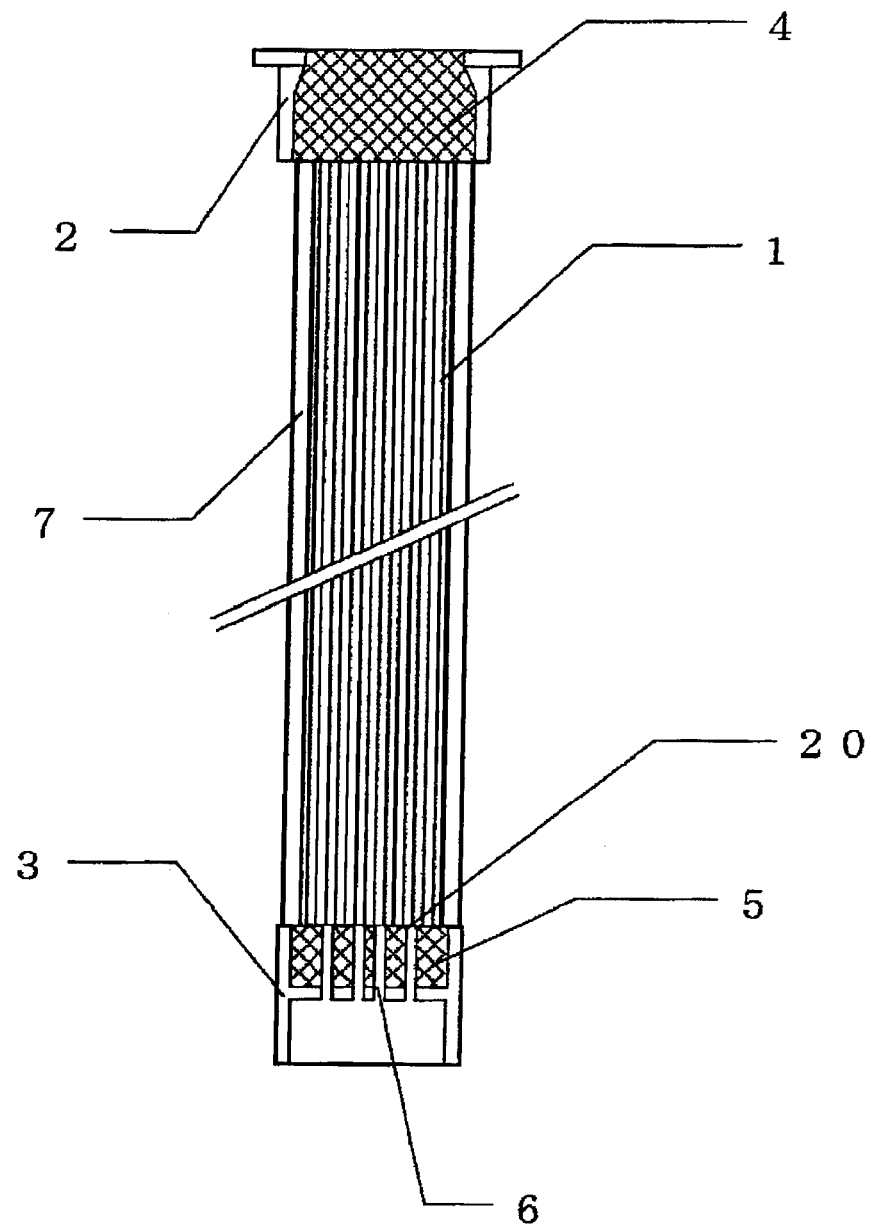
FIG. 1 is an explanatory diagram of an embodiment of the hollow fiber membrane filter element.

The hollow fiber membrane bundle can be used in filtration treatment, such as external pressure filtration, as a filter element whose open end face is connected to a component that is connected to piping of a filtration device for charging raw water. FIG. 1 shows an example of the hollow fiber membrane filter element that is used in external pressure filtration. The hollow fiber membrane filter element includes a hollow fiber membrane bundle 1 composed of a plurality of hollow fiber membranes, an upper head 2, and a lower ring 3. The upper head 2 and the lower ring 3 serve as surrounding members for the end fixing portions and fix the hollow fiber membranes at the top fixing portion 4 and the bottom fixing portion 5, respectively, and are connected to a column 7. The lower ring 3 is delimited by a partition plate having through-holes 6 at the center area, at which the end fixing portion 5 is formed. In another conformation, a hollow fiber membrane filter element includes a hollow fiber membrane bundle disposed in a cylinder with approximately the same length as that of the hollow fiber membrane bundle.

In the method of producing the hollow fiber membrane bundle of the present invention, it is necessary to configure hollow a fiber membrane bundle by bundling a plurality of hollow fiber membranes and inserting an insert inside the hollow fiber membrane bundle at the central side in the length direction of the membrane than a region where an end fixing portion is formed using, for example, a casting material (hereinafter, occasionally abbreviated to "end fixing portion-forming region"). It is possible to evenly distribute the ends of the hollow fiber membranes in the end fixing portion-forming region by disposing the insert at the central side than the end fixing portion-forming region. A hollow fiber membrane bundle whose hollow fiber membranes are evenly distributed at the end fixing portion can be obtained by fixing the ends of the hollow fiber membranes with, for example, a casting material, in this state.

Examples of the hollow fiber membranes used can include reverse osmosis membranes, ultrafiltration membranes, and microfiltration membranes. Any known material can be used for the hollow fiber membrane without particular limitation, and examples thereof include polysulfones, polyethersulfones, polyacrylonitriles, polyimides, polyetherimides, polyamides, polyetherketones, polyetheretherketones, polyethylene, polypropylene, poly-4-methylpentene, cellulose, cellulose acetate, polyvinylidene fluoride, polyethylene-tetrafluoroethylene copolymers, polytetrafluoroethylene, and composite materials thereof. Furthermore, a membrane having an inner diameter of 50 to 3000 μm and an inner diameter/outer diameter ratio of 0.3 to 0.8 can be preferably used.

The end fixing portion is fixed, for example, with a fixing material, such as a casting material. In this description, the casting material is a resin for forming a fixing portion by bonding and/or fixing hollow fiber membranes to each other and is, in general, a two liquid hardening resin component or a thermoplastic resin. The two liquid hardening resin component hardens when a plurality of compounds having reactivity is mixed and, usually, is also called a two-component adhesive or a two-component casting resin and is hardened after mixing of these two liquids, called as a main agent and a curing agent, when used. In the present invention, preferably used resins are a urethane resin composed of a main agent containing isocyanate as a reactive group and a curing agent containing an active hydrogen-containing organic compound; an epoxy resin composed of a main agent containing an epoxy group as a reactive group and a curing agent containing an active hydrogen-containing organic compound or an organic acid anhydride; and a silicone resin composed of a vinyl group-containing polysiloxane and hydrosilyl group-containing polysiloxane. Furthermore, the thermoplastic resin preferably has a melting point lower than that of the polymer constituting the hollow fiber membrane and is physically and chemically resistive to raw water to be filtered. Specific examples include thermoplastic resins, such as polyurethanes, polyesters, polyethylene, and polypropylene, and waxes.

In the method for producing a hollow fiber membrane bundle, an insert is used. The insert is a spacer disposed for evenly distributing ends of the membranes by partially forming gaps between these membranes during the process of producing the hollow fiber membrane bundle. The insert preferably has an apparent density of 1.0 g/cm$^3$ or less, more preferably 0.4 g/cm$^3$ or less, and further preferably 0.1 g/cm$^3$ or less. Practically, an apparent density of 0.04 g/cm$^3$ is preferred.

At an apparent density of the insert of 1.0 g/cm$^3$ or less, even when the hollow fiber membrane bundle is produced by putting the insert sideways inside the fiber membrane bundle, the hollow fiber membranes under the inserts are not distorted. In addition, when the end fixing portion is formed by injecting a casting material by centrifugal molding as described below, the position of the insert may move due to the centrifugal force. However, such a shift is moderated by using an insert having an apparent density of 0.4 g/cm$^3$ of less, and is negligible by an insert having an apparent density of 0.1 g/cm$^3$ or less.

The apparent density of the insert is a value obtained by dividing the mass of the insert by its volume. The volume herein is the interior volume of a three-dimensional structure surrounded by planes tangent to the outermost surface of the insert.

The insert is preferably a hollow material. The hollow material is a collective name of those having a space inside thereof. Specifically, the hollow material is a three-dimensional structure including a solid portion and a space inside a structure formed of the solid portion. The space may be sealed or may communicate with the external space. Furthermore, the space may be partitioned into a plurality of sub-spaces. The space is filled with a gas and/or a liquid.

Figure 2:
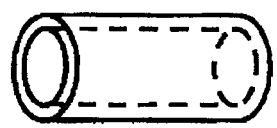
FIG. 2 (*a-g*) is explanatory diagram of an embodiment of the insert.
Figure 2:
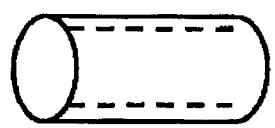
Figure 2:
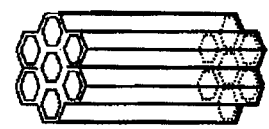
Figure 2:
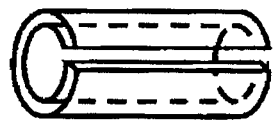
Figure 2:
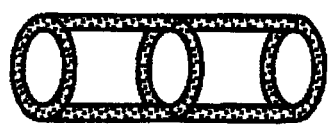
Figure 2:
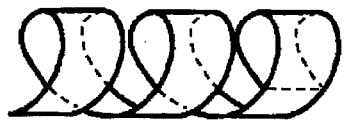
Figure 2:
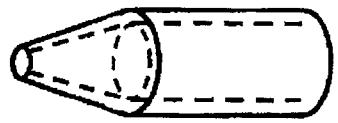

The shape of the hollow material is not particularly limited, and examples thereof include tube, cage, balloon, foam, porous structures, and foamed structures. FIG. 2 shows examples of the hollow materials having a tubular shape or a cage shape. Among these hollow materials, preferred are balloon materials and foam, which contain a gas and/or a liquid inside thereof, having an apparent density of 0.1 g/cm$^3$ or less. Furthermore, the balloon material can be reduced in volume by extracting the gas and/or the liquid inside thereof just before the removal of the material and, therefore, can be readily removed from the inside of the hollow fiber membrane bundle. Examples of the liquid enclosed inside include ethanol, calcium chloride solution, and water.

Preferable examples of the foam include those that are formed by winding foamed polyethylene sheets or bubble sheets that are commercially available as shipping supplies, tubes filled with air, and foams or foamed beads formed by molding with dies.

The insert may have any shape without particular limitation and is preferably a sphere, an ellipsoid, a cylinder, or a polygonal column. A shape having less angular portions, for example, a sphere, an ellipsoid, or a cylinder, has a low probability to damage the hollow fiber membranes and is therefore preferred. In addition, it is preferable that the insert partially has a shape of which the cross-section perpendicular to the major axis is circular, ellipsoidal, or polygonal and the circle-equivalent diameter is decreased from the center toward one or both of the ends, that is, a circular cone, a pyramid, a circular truncated cone, or a truncated pyramid, and a shape including such a shape and a portion of a cylinder or a rectangular column. A particularly preferred shape has, for example, a cone at one end of a cylinder as shown in FIG. 2-g. Another example has a pyramid at one end of a rectangular column. The distribution of hollow fiber membranes can be readily achieved by setting the inserts in a hollow fiber membrane bundle such that the narrowing end faces the end fixing portion. The circle-equivalent diameter corresponds to the diameter of a circle having the same cross-section area.

Any material can be used for constituting the insert without particular limitation, and examples of the material include metal materials such as stainless steel and aluminum, ceramic materials such as glass and ceramics, and organic polymer materials such as thermoplastic resins and rubber. Among them, preferred are materials having flexibility, such as thermoplastic resins and rubber. The tensile modulus of such a material is 1 to 3000 MPa, for example. Furthermore, the insert of the present invention may be diluted with a water-soluble material. Examples of the material include water-soluble inorganic salts of alkali metals or alkaline-earth metals such as sodium chloride, potassium chloride, calcium chloride, magnesium chloride, sodium nitrate, potassium nitrate, calcium nitrate, magnesium nitrate, sodium sulfate, potassium sulfate, magnesium sulfate, sodium phosphate, potassium phosphate, and sodium silicate; water-soluble organic polymers such as polyethylene oxide and polyvinylpyrrolidone; and water-soluble organic compounds such as soluble starch, carboxymethylcellulose, hydroxyethylcellulose, and hydroxypropylcellulose. These may be used alone or as a mixture of two or more thereof. In particular, a combination of a soluble starch and a water-soluble organic polymer and a combination of a soluble starch and a water-soluble organic compound can provide an insert having a low apparent density and a relatively high mechanical strength and are therefore preferred. Furthermore, a water-soluble insert has an advantage in that the insert can be removed by dissolving it with, for example, water after producing a hollow fiber membrane bundle. In particular, such an insert is useful when the hollow fiber membrane bundle is contained in, for example, an external cylinder and, thereby, the insert is difficult to be removed.

The size of the insert can be determined according to the length and the diameter of the membrane bundle, the filling rate, the positions of the through-holes, and other factors. For example, when a hollow fiber membrane to be prepared has a length of 1000 to 2500 mm and a diameter of 100 to 200 mm, the insert may have a diameter of about 50 to 100 mm and a length of about 400 to 2000 mm. Furthermore, the diameter of the insert is desirably one-fourth to two-third of that of the hollow fiber membrane bundle to be prepared.

In the production method of the present invention, when a plurality of hollow fiber membranes are bound up and their ends are fixed with, for example, a casting material, it is necessary to place the insert between the hollow fiber membranes at a position inner than the end fixing portion-forming region. First, hollow fiber membranes for constituting a hollow fiber membrane bundle are prepared. The advantageous effect of the present invention is particularly achieved when the membrane filling rate of the hollow fiber membranes at the interface 20 inner than the end fixing portion of the hollow fiber membrane bundle is 5 to 40%. Accordingly, it is preferred to use the hollow fiber membranes so as to satisfy this membrane filling rate. The membrane filling rate is more preferably in the range of 10 to 30%. The diameter of the hollow fiber membrane bundle is preferably 30 to 800 mm and more preferably 100 to 800 mm. Therefore, it is necessary to determine the membrane filling rate and prepare the hollow fiber membranes with consideration of this point. The length of the hollow fiber membrane bundle after the fixing of the ends is preferably in the range of 300 to 3000 mm.

In this description, the membrane filling rate is a ratio of the sum area of cross-section areas of the hollow fiber membranes to the cross-section area of the fixing portion of the hollow fiber membrane bundle at the inner side. That is, the membrane filling rate is a value calculated by (outer diameter of hollow fiber membrane)$^2 \times (\pi/4) \times$(the number of membranes)/(cross-section area of fixing portion of the hollow fiber membrane bundle at the inner side). When the membrane filling rate is adjusted to the above value, the hollow fiber membranes are prevented from uneven distribution, and a hollow fiber membrane bundle provided with appropriate intervals among hollow fiber membranes can be obtained. It is preferable that one ends of the hollow fiber membranes be occluded with, for example, an adhesive and be then divided into some sub-bundles, before the insert is disposed into the hollow fiber membrane bundle.

Then, the insert is disposed. The insert is desirably disposed near the end at the through-holes side, if the through-holes are provided. The insert is disposed in the hollow fiber membrane bundle at a position inner than the region where the end fixing portion (the end fixing portion-forming region) is provided. The distance of the position from the region of the end fixing portion can be determined based on the size of the insert, the diameter, length, and filling rate of the hollow fiber membrane bundle to be prepared, and other factors. Specifically, the insert is preferably set such that the end of the insert is positioned in the range of 10 to 200 mm from the end of the end fixing portion-forming region, preferably 30 to 100 mm and more preferably 40 to 70 mm. When the insert is positioned in this range, the casting material or the like is prevented from adhering to the insert, and the hollow fiber membranes are more evenly distributed at the end fixing portion. Furthermore, it is preferable that the distance of the insertion position from the end fixing region be increased with the diameter of the insert. For example, when the diameter is 50 to 100 mm, the distance is within the range of 30 to 100 mm and preferably 40 to 70 mm.

The number of the insert can be adequately determined based on the size of the end fixing portion and the membrane filling rate at the interface of the end fixing portion. For example, when the membrane filling rate at the interface of the end fixing portion is 20% or more and the end fixing portion has a diameter of 200 mm or less, the number of the insert may be one or two. When the membrane filling rate is 20% or more and the diameter exceeds 200 mm, the number of the insert is preferably in the range of two to four. When the membrane filling rate is 5% or more and less than 20% and the end fixing portion has a diameter of 200 mm or less, the number of the insert may be two or three. When the membrane filling rate is 5% or more and less than 20% and the diameter exceeds 200 mm, the number of the insert is preferably in the range of three to six.

When the number of the insert is one, the insert is preferably positioned as close to the center of the bundle as possible. When pluralities of inserts are used, the inserts are preferably disposed uniformly in the circumferential direction of the membrane bundle, or the inserts may be positioned in a line in the length direction of the membrane.

When through-holes are provided to the hollow fiber membrane bundle, the insert is disposed at least to the end fixing portion-forming region at the through-hole side. In addition, a fixing portion at the side not having the through-holes may be formed by disposing the insert to the end fixing portion-forming region. In such a case, this fixing portion can also provide an effect to evenly distribute the hollow fiber membranes. As a result, the air aerated from the through-holes ascends to the upper portion of the membrane bundle, which brings an advantage that sludge at this portion can be more effectively exfoliated.

The insert is desirably disposed between the hollow fiber membranes on a casting jig. On this occasion, it is better to previously set members for forming the end fixing portion with a casting material, which is described below, on the casting jig for improving the working efficiency and thereby forming a better end fixing portion in the hollow fiber membrane bundle.

Furthermore, in order to form through-holes in the hollow fiber membrane bundle, through-hole-forming pins are inserted in the end of the hollow fiber membrane bundle containing the insert at the side where the through-holes will be provided. When members such as a lower ring are disposed at the end where the through-holes will be formed and these members are previously provided with through-holes, the through-hole-forming pins are inserted through these holes. The lengths of the through-hole-forming pins are preferably the same as or 5 to 20 mm longer than that of the end fixing portion to be formed. The through-holes preferably have an equivalent diameter of 2 to 30 mm and more preferably 5 to 25 mm. The through-holes having diameters within this range can uniformly send a sufficient amount of air bubbles into the hollow fiber membrane bundle even if suspension solids in raw water adhere near the holes. In this description, the equivalent diameter is defined as 4×(cross-section area of channel)/(circumferential length). The through-holes may have any shape, for example, a polygon such as a triangle, a quadrangle, or a hexagon, a circle, an ellipse, a sector, a C-letter shape, or a star shape.

The number of the through-holes varies depending on the cross-section area of the end fixing portion and the equivalent diameter of the through-holes and is preferably within the range of about 2 to 300, more preferably 5 to 100, and most preferably 10 to 60. It is desirable to adjust the equivalent diameter and the number of the through-holes based on the total opening area of the through-holes, i.e., (equivalent diameter of through-hole)$^2$×π/4×(number of through-hole), and the amount of air to be introduced.

In addition to the through-hole-forming pins, resin bars are preferably inserted in the end fixing portion-forming region. These resin bars may be one that is generally used for reducing the amount of a casting material. The insertion of these resin bars leads to the following effects: (1) the hollow fiber membranes can be evenly distributed by finely adjusting the positions where the through-hole-forming pins and the resin bars for reducing the amount of a casting material are inserted; and (2) the relative positions of the hollow fiber membranes can be kept by disposing the through-hole-forming pins and the resin bars between the hollow fiber membranes. Consequently, the hollow fiber membranes can be prevented from movement, which is caused by flow generated when the casting material is poured into the hollow fiber membrane bundle, and thereby the uniform distribution of the hollow fiber membranes can be maintained.

As a result, the uniformity of the membrane distribution can be significantly improved by inserting the through-hole-forming pins and the resin bars in the end fixing portion-forming region of the hollow fiber membrane bundle. The lengths of the pins and the resin bars can be determined based on the length of the region of the end fixing portion and is preferably 30 to 95% of the length of the region of the end fixing portion and more preferably 50 to 90%. The diameter is preferably 5 to 30 mm. The number of the resin bars to be inserted can be determined based on the length and the diameter of the hollow fiber membrane bundle, the diameters of the resin bars, and other factors and is preferably 5 to 100. The resin bars are inserted evenly in the circumferential direction of the hollow fiber membrane bundle. Then, the end is fixed by covering the circumference of the hollow fiber membrane bundle with, for example, cloth or a film. Then, casting members, such as casting material cups, for forming the end fixing portions with a casting material are disposed at the upper and lower ends of the membrane bundle and are connected to casting material pots with injection hoses. The casting members may be provided via members that are parts of a filter element, for example, members surrounding the end fixing portions, such as the upper head and the lower ring, or these members can be provided as the casting members. A hollow fiber membrane filter element including an external cylinder containing the hollow fiber membrane bundle fixed at the end can be obtained by inserting the hollow fiber membrane bundle containing the insert into the external cylinder and then setting the casting members. The fixing of the ends of hollow fiber membranes may be carried out by a method wherein a casting material is injected in the end of the hollow fiber membrane bundle. Examples of the method for injecting the casting material include a centrifugal molding method wherein a casting material is injected by a centrifugal force and a static molding method wherein a casting material is injected by hydraulic head difference or pressure of a pump.

Among them, the centrifugal molding method, which can conduct uniform injection between hollow fiber membranes, is therefore more preferred. In the case that the fixing portion is formed by the centrifugal molding method, it is more preferable that an insert having an apparent density of 0.1 g/cm$^3$ or less be used. An insert having an apparent density of 0.1 g/cm$^3$ or less is prevented from moving toward the fixing portion-forming region, and the hollow fiber membranes are also more evenly distributed to the central area of the end fixing portion.

After being fixed, the end is hardened. Then, the insert is removed from the hollow fiber membrane bundle. If the insert remains between the membranes, the insert may adversely affect discharge of sludge and other substances during filtration processing. The insert may be removed by picking up the hollow fiber membranes by hands, by pulling the content in the insert out and then drawing the insert out, or dissolving the insert itself with, for example, water or heat. Then, the through-hole pins and the resin bars are drawn out by any means to give a hollow fiber membrane bundle.

The insert makes the hollow fiber membranes curve moderately toward the center of the bundle in the range from the portion of the insert to the end. As a result, the hollow fiber membranes are evenly distributed at the end fixing portion-forming region. Accordingly, a hollow fiber membrane bundle having evenly distributed hollow fiber membranes at the end fixing portion can be obtained by fixing the ends of the hollow fiber membranes in this state. Furthermore, the state of evenly distributed hollow fiber membranes can be readily retained by inserting, for example, through-hole-forming pins or resin bars for reducing the amount of a casting material in the end fixing portion-forming region of the hollow fiber membrane bundle. In addition, the evenness can be further improved by finely controlling the distribution of the hollow fiber membranes by the way of insertion.

In the hollow fiber membrane bundle obtained by the above-described process, the hollow fiber membranes are evenly distributed at the end fixing portion. The distribution is specifically shown as follows:

First, the distribution is characterized in that the membrane filling rate ratio at the cross-section of the end fixing portion is within a certain range. That is, in a cross section perpendicular to the length direction of the membrane at the end fixing portion, when the cross section is divided into segments with straight lines that are orthogonal to the diameter of the cross section and equally divide the diameter into three, any two segments have a membrane filling rate ratio of 0.4 to 2.5, preferably 0.8 to 1.3, more preferably 0.9 to 1.2, and most preferably 1.0 to 1.1.

Figure 6:
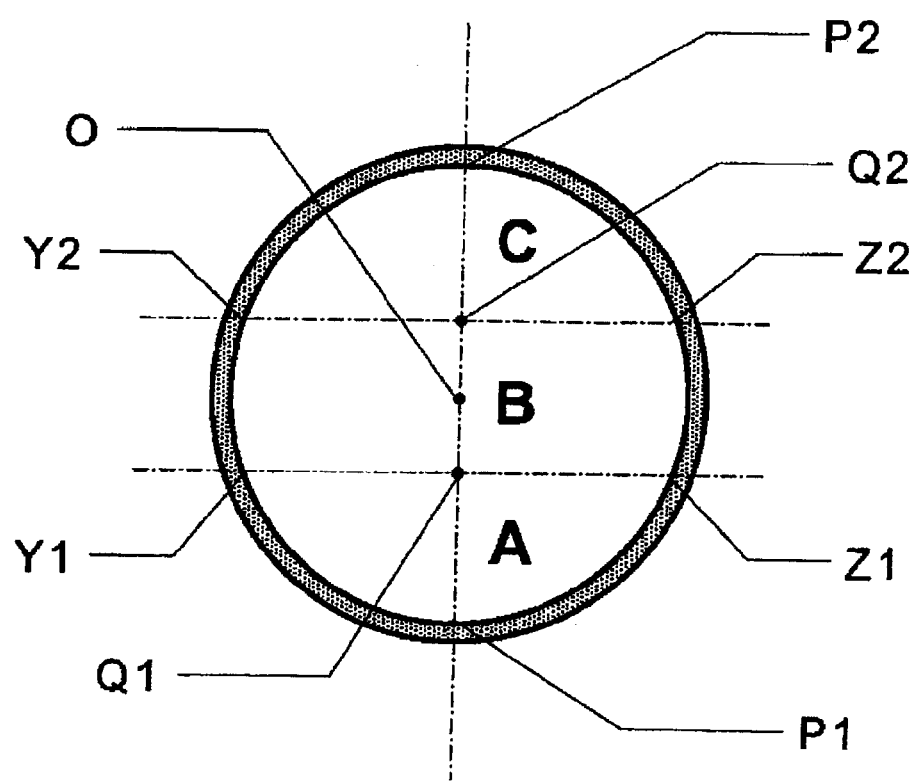
FIG. 6 is an explanatory diagram of a method for evaluating the distribution of hollow fiber membranes at an end fixing portion.

The determination process of the membrane filling rate ratio of each segment is described with reference to FIG. 6. FIG. 6 shows an example of an interface of the hollow fiber membrane bundle at the inner side of the end fixing portion. First, a center line O passing the center of this interface is drawn. The center line is drawn such that the line passes through as many portions of the minimum number of the membranes on the interface as possible. The center line is equally divided into three with lines (perpendicular lines) orthogonal to the center line to divide the cross section into three segments. The points where these perpendicular lines intersect with the periphery of the end fixing portion are denoted by Y1, Z1, Y2, and Z2, and the points where the center line intersects the periphery of the end fixing portion are denoted by P1 and P2. A region surrounded by the periphery of the end fixing portion passing through the point P1 and the line Y1-Z1 is defined as a segment A. A region surrounded by Y1, Y2, Z1, Z2, and the peripheries of the end fixing portion lying therebetween is defined as a segment B. A region surrounded by the periphery of the end fixing portion passing through the point P2 and the line Y2-Z2 is defined as a segment C. Calculated areas of the segments A, B, and C are denoted by SA, SB, and SC, respectively. The areas corresponding to the through-holes present in each segment are precluded from the above-mentioned each area. Counted numbers of the hollow fiber membranes present in the segments A, B, and C are denoted by MA, MB, and MC, respectively. When a through-hole or a hollow fiber membrane lies astride two of the segments, they are divided proportionally according to the area ratio of the segments where it lies. The MA/SA, MB/SB, and MC/SC are membrane filling rates of the respective segments. A ratio of the membrane filling rates of any two segments selected from the three segments corresponds to the ratio of the membrane filling rate between the two segments.

Next, the distribution is characterized in that the hollow fiber membranes are disposed approximately parallel to each other at the end fixing portion of the hollow fiber membrane bundle. That is, when a cross section obtained by cutting the end fixing portion along the central axis is observed, 90% or more of the hollow fiber membranes are fixed approximately parallel to each other at an angle of 0 to 20° to the direction of the central axis, preferably 0 to 15°, and more preferably 0 to 10°.

As described above, in the hollow fiber membrane bundle having a fixed end, appropriate gaps are securely formed between the hollow fiber membranes. Therefore, sludge and other substances hardly accumulate, and also sludge and other substances adhering to the membranes can be easily exfoliated by, for example, backwashing.

EXAMPLES

Examples of the present invention will be described below, but the present invention is not limited thereto.

Example 1

A filter element including a hollow fiber membrane bundle, which had an end fixed using a foamed polyethylene cylindrical insert by centrifugal molding, was produced. The insert was formed by winding a foamed polyethylene sheet having a thickness of 1 mm so as to have an outer diameter of 75 mm and an entire length of 800 mm. The weight and the volume of the insert were measured to determine an apparent density of 0.04 g, cm$^3$.

The volume of the insert was measured as follows: the insert was put in a polyethylene bag of 50 μm and was immersed in water such that air trap was not formed in the bag. The buoyant force when the insert was completely immersed in the water was measured, and the volume A was calculated from the measured buoyant force and the density of the immersing water. Separately, the volume B of the immersed polyethylene bag was similarly calculated. The volume of the insert was determined by subtracting the volume B from the volume A.

Figure 3:
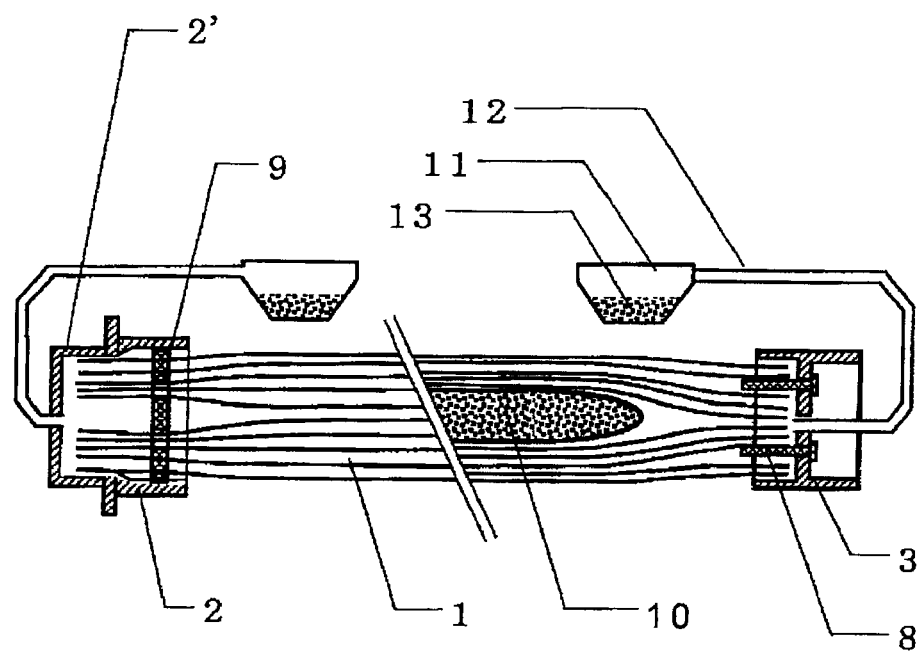
FIG. 3 is an explanatory diagram of an embodiment of the method for forming a fixing portion of a hollow fiber membrane filter element bundle.

A filter element including a hollow fiber membrane bundle, which has an end fixed using the above-described insert as follows, was produced. FIG. 3 is a conceptual diagram illustrating a method of forming a fixing portion. Hollow fiber membranes used were 3300 polyvinylidene fluoride microfiltration membranes, each having a micropore diameter of 0.1 μm, an outer diameter of 1.2 mm, and an inner diameter of 0.6 mm. A member that was used for fixing a hollow fiber membrane bundle to form a filter element included an upper head 2 having an inner diameter of 155 mm and a height of 70 mm and a lower ring 3 having an inner diameter of 140 mm and a height of 88 mm that were connected with two pipes (not shown) having a diameter of 13 mm and a length of 2080 mm. On one side face of the upper head 2, a casting material cup 2' having an inner diameter of 140 mm and a height of 40 mm was integrated. The lower ring had a height of 88 mm and had segments for forming an end fixing portion by delimiting the inside of the lower ring in the direction perpendicular to the height direction at a height of 38 mm with a partition plate having 24 through-holes with a diameter of 11 mm.

Constructional members for the filter element were set on a casting jig. The casting jig included a bundle-receiving portion at the center for receiving a hollow fiber membrane bundle and having a U-shaped cross section and a length of 1800 mm, a head-fixing portion for fixing the upper head 2 at one end, and a ring-fixing portion for fixing the lower ring 3 at the other end. The bundle-receiving portion, the head-fixing portion, and the ring-fixing portion were integrated with a base plate.

First, the hollow portions of the hollow fiber membranes were occluded by 5 mm from the ends of the hollow fiber membranes adjacent the upper head 2, and then the membranes were divided into unbound three bunches each including 1100 membranes. Each bunch was inserted into a porous plate 9 having a diameter of 150 mm and three holes with a diameter of 55 mm, and the porous plate 9 was put in the upper head 2.

Then, the hollow fiber membranes were divided into two bunches each including 1650 membranes at the lower ring. One of the bunches was horizontally set in the lower ring 3, and then the insert 10 was disposed on the bunch. On this occasion, as shown in FIG. 3, the insert 10 was disposed such that an end of the insert was located at a position 50 mm apart from the end of the lower ring 3 toward the inner side of the hollow fiber membrane bundle 1. Then, the other hollow fiber membrane bunch was placed thereon, and the hollow fiber membranes were evenly disposed around the insert such that the insert 10 was not directly exposed to the exterior. Then, the ends at the lower ring side of the hollow fiber membranes were put in the lower ring. Furthermore, as shown in FIG. 3, 24 through-hole-forming pins 8, each having a diameter of 11 mm, a length of 70 mm, and having a disk of 15 mm diameter at one end, were inserted in the hollow fiber membrane bundle through the through-holes (partially shown) provided to the lower ring. The through-hole-forming pins were inserted one-by-one from the lower side to the upper side of the hollow fiber membrane bundle horizontally disposed.

Then, the hollow fiber membrane bundle set to the upper head 2 and the lower ring 3 was fixed to the casting jig (not shown). On this occasion, the circumference of the hollow fiber membranes surrounding the insert was covered with cloth, and the hollow fiber membrane bundle was fixed to the casting jig with a belt over this cloth. This casting jig was set to a centrifugal molding rack (not shown).

Casting material pots 11 placed on the centrifugal molding rack, the casting material cup 2' of the upper head 2, and the lower ring 3 were connected with injecting hoses 12. In the casting material pots 11, a mixture of two liquid urethane resin components as casting material 13 was fed. Then, the centrifugal molding rack was rotated at a rate of 177 rpm to apply a centrifugal force of 35 G to the end fixing portion-forming region. After 90 minutes, the rotation was stopped, and the casting jig was dismounted from the centrifugal molding rack. The casting jig was separated at the connection of the casting material cup 2' and the injection hose and the connection of the injection hose and the lower ring, and hollow fiber membrane bundle was heated at 50° C. for 24 hours in a desiccator. Then, openings were made in the hollow fiber membranes by cutting the membranes at the boundary of the casting material cup 2' and the upper head 2.

Then, the belt was unfastened to detach the hollow fiber membrane bundle and the components of the filter element, and the cloth covering the whole hollow fiber membranes was removed. Then, the insert in the hollow fiber membrane bundle 1 was removed by picking up the hollow fiber membranes by hands. The through-hole-forming pins 8 in the lower ring were drawn out. In the fixing portion 5 at the lower ring, through-holes 6 having a diameter of 11 mm were formed.

As a result, a filter element having two ends fixed with a casting material and including hollow fiber membrane bundle in which the circumferences of the both ends were fixed to the upper head 2 and the lower ring 3, respectively, was obtained. The effective length of the filtration portion between the interfaces of the end fixing portion 4 at the upper head and the end fixing portion 5 at the lower ring was 2000 mm, the membrane area was 25 m$^2$, and a hollow fiber membrane filling rate at the end fixing portion of the lower ring was 24%.

Careful observation of the hollow fiber membrane bundle confirmed no defect in the hollow fiber membranes after the drawing out of the insert. In addition, no trace of the insert dented in the end fixing portion was found.

Figure 5:
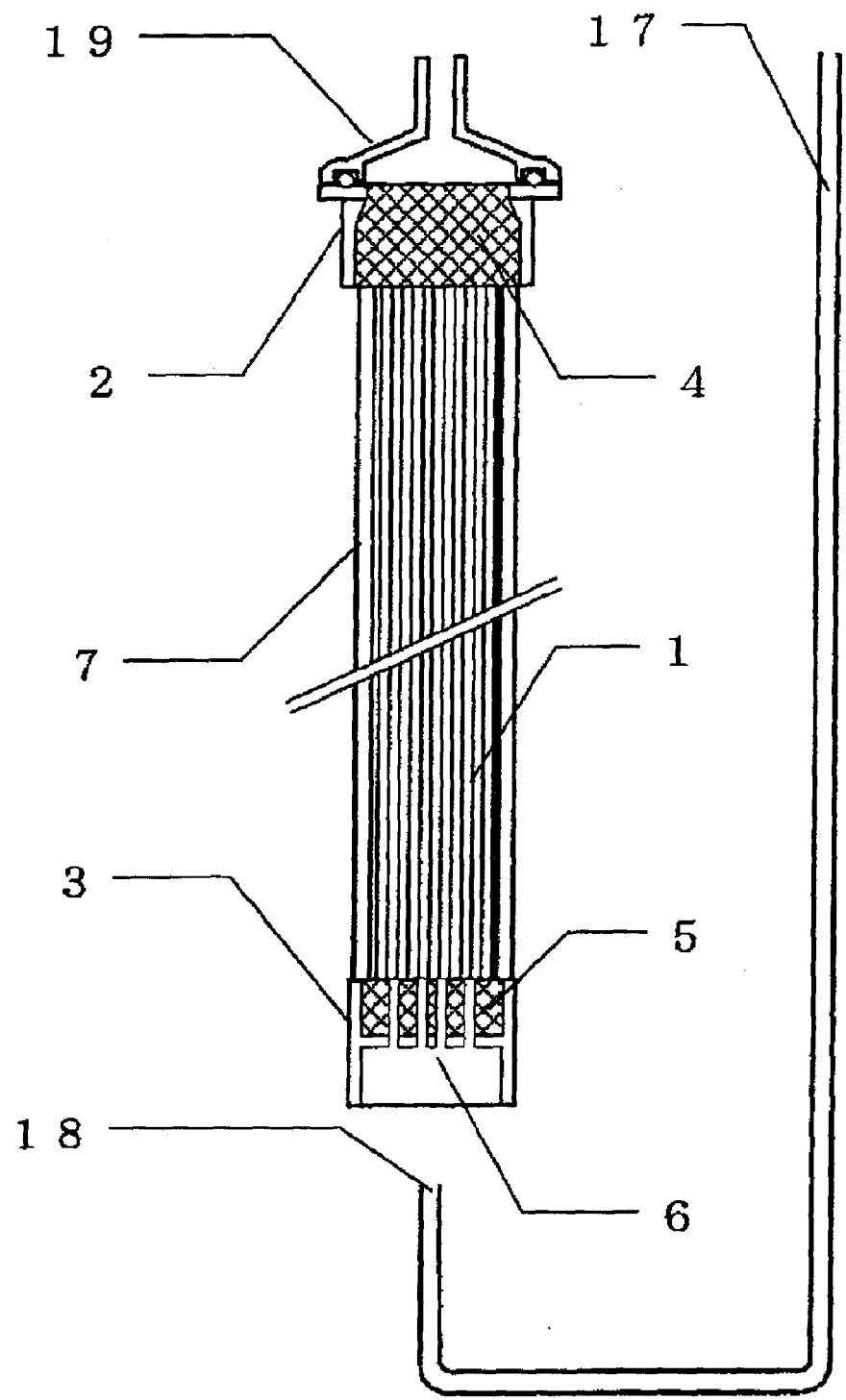
FIG. 5 is an explanatory diagram of the arrangement of a gas inlet tube in an aeration test of a hollow fiber membrane filter element.

The hollow fiber membrane filter element was immersed in water and aerated so that the conditions of the membranes were observed. First, the hollow fiber membrane filter element was immersed vertically in a transparent tank with a volume of 8 m$^3$. FIG. 5 shows a relation between the filter element and piping for aeration. That is, an aeration gas inlet tube 17 with a diameter of 2 cm was placed such that a nozzle 18 for jetting aeration gas upward is disposed at a position 20 cm below the end fixing portion 5 at the lower ring and approximately in the center of the fixing portion 5 at the lower ring. In addition, a water-collecting cap 19 for connecting a filtered water piping was attached to the upper head. The water-collecting cap 19 was connected to the filtered water piping (not shown) and was fixed to the tank.

Suction filtration was conducted using a suction pump connected to the filtered water piping at a membrane filtration flux of 0.6 m$^3$/m$^2$ membrane area/day, while air is fed from the aeration gas inlet tube 17 at a rate of 6 Nm$^3$/hr. The fed air vibrated each hollow fiber membrane without dissipation near the end fixing portion 5 at the lower ring and moved to the upper portion of the hollow fiber membrane bundle. It was confirmed that the air sufficiently agitated the water surrounding the hollow fiber membranes.

Furthermore, this hollow fiber membrane filter element was immersed in an activated-sludge tank so that a filtration test was carried out. Urban wastewater having an average BOD level of 150 mg/L and an SS level of 160 mg/L was used as the raw water for activated sludge. Suction filtration was conducted using a suction pump at a membrane filtration flux of 0.6 m$^3$/m$^2$ membrane area/day, while air was fed from the aeration gas inlet tube 17 at a rate of 6 Nm$^3$/hr. On this occasion, the transmembrane pressure was −15 to −20 kPa and was stable for three months. Throughout the test, the average MLSS level of the activated-sludge tank was 10000 mg/L, and the average temperature was 25° C.

After the filtration, the weight of sludge and foreign substances adhering to the hollow fiber membranes was 3.2 kg. The weight of sludge and foreign substances was determined by subtracting the weight of the wet hollow fiber membrane filter element before the filtration test from the wet weight of the hollow fiber membrane filter element after the filtration test.

Furthermore, the cross section of the end fixing portion of the hollow fiber membrane bundle was observed as follows: First, the end fixing portion 4 of the hollow fiber membrane bundle at the upper head was equally cut into four in the axis direction and was observed the casting material present between the hollow fiber membranes in the end fixing portion 4 of each cross section. The casting material was observed in all cross sections, and no defect was found.

Then, the hollow fiber membranes and a column were cut near the lower ring, and the lower ring was drawn out. The free ends of the hollow fiber membranes fixed to the lower ring were plucked out and removed, and the distribution of the hollow fiber membranes in the end fixing portion was observed. First, a positional relation between the through-holes and the hollow fiber membranes was visually observed. All of the through-holes 6 were present inside the hollow fiber membrane bundle. Furthermore, the ends of the hollow fiber membranes were present between all of the through-holes 6.

Furthermore, the arrangement of the hollow fiber membranes at the interface of the end fixing portion at the lower ring was observed. First, the whole face of the end fixing portion at the side where the hollow fiber membranes open was photographed. This photograph was enlarged to approximately two times, and the fixed region was divided into three segments as described below. The proportion of the membrane filling rate in each segment was calculated. FIG. 6 is an explanatory drawing thereof.

First, a center line was drawn that passes through a point P1 of the lower ring fixing portion placed at the lower side when the centrifugal molding was carried out and passes through the center O of the lower ring. The point that the center line intersected the periphery of the lower ring fixing portion was defined as a point P2. A line was drawn that passed through the point Q1 47 mm apart from the point P1 and was perpendicular to the center line. The points at which this perpendicular line intersected the periphery of the lower ring fixing portion were denoted as points Y1 and Z1. A line was drawn that passed through the point Q2 47 mm apart from the point P2 and was perpendicular to the center line. The points at which this perpendicular line intersected the periphery of the lower ring fixing portion were denoted as points Y2 and Z2. A region surrounded by the periphery of the lower ring fixing portion passing through the point P1 and the line Y1-Z1 was defined as a segment A. A region surrounded by the periphery of the lower ring fixing portion Y1-Y2, the periphery of the lower ring fixing portion Z1-Z2, the line Y1-Z1, and the line Y2-Z2 was defined as a segment B. A region surrounded by the periphery of the lower ring fixing portion passing through the point P2 and the line Y2-Z2 was defined as a segment C. The calculated areas of the segments A, B, and C were denoted by SA, SB, and SC, respectively. The areas corresponding to the through-holes present in each segment were precluded from the above-mentioned each area. The counted numbers of the hollow fiber membranes present in the segments A, B, and C were denoted by MA, MB, and MC, respectively. When a through-hole or a hollow fiber membrane lay astride two of the segments, they were divided proportionally according to the area ratio of the segments where it lay. The membrane filling rate ratios, [FA/FB] and [FA/FC], of the segments A, B, and C were calculated by the following expressions:

$$[FA/FB]=(MA/SA)/(MB/SB), \text{ and}$$

$$[FA/FC]=(MA/SA)/(MC/SC).$$

[FA/FB] was 1.0, and [FA/FC] was 1.1.

Then, the end fixing portion at the lower ring of the hollow fiber membrane bundle was cut along the central axis, and the cross section was observed. Ninety percent or more of the hollow fiber membranes were fixed approximately parallel to each other at an angle of 0 to 10° to the direction of the central axis.

Example 2

A filter element having hollow fiber membrane bundle was produced by centrifugal molding using a commercially available rubber balloon inflated with air as an insert. The insert had a cylindrical shape having an outer diameter of 70 mm, a total length of 800 mm, and a hemispherical shape with an outer diameter of 70 mm at the opposite side of the sealing portion. The apparent density of the insert was 0.02 g/cm$^3$. The apparent density was determined as in Example 1 except that the volume was measured by directly immersing the insert in water without use of a polyethylene bag.

A filter element having hollow fiber membrane bundle was produced as in Example 1 using this insert. The insert could be significantly easily drawn out from the hollow fiber membrane bundles by deflating the insert for reducing the volume and then taking it out. Careful observation of the hollow fiber membrane bundle confirmed no defect in the hollow fiber membranes after the drawing out of the insert. In addition, no trace of the insert dented in the end fixing portion was found.

Then, the resulting filter element was aerated in water as in Example 1, and the conditions of the membranes were observed. The fed air vibrated each hollow fiber membrane without dissipation near the end fixing portion at the lower ring and moved to the upper portion of the hollow fiber membrane bundle. It was confirmed that the air sufficiently agitated the water surrounding the hollow fiber membrane bundle.

Furthermore, the cross section of the end fixing portion of the hollow fiber membrane bundle was observed as follows: First, the end fixing portion 4 at the upper head was equally cut into four in the axis direction and was observed the casting material present between the hollow fiber membranes in the end fixing portion 4 of each cross section. The casting material was observed in all cross sections, and no defect was found.

Then, as in Example 1, the distribution of the hollow fiber membranes in the end fixing portion was observed. First, a positional relation between the through-holes and the hollow fiber membranes was visually observed. All of the through-holes 6 were present inside the hollow fiber membrane bundle. Furthermore, the ends of the hollow fiber membranes were present between all the through-holes 6.

Then, as in Example 1, the end fixing portion was divided into three segments, and the proportion of the membrane filling rate in each segment was calculated. [FA/FB] was 1.1, and [FA/FC] was 1.0.

Then, the end fixing portion at the lower ring of the hollow fiber membrane bundle was cut along the central axis, and the interface was observed. Ninety percent or more of the hollow fiber membranes were fixed approximately parallel to each other at an angle of 0 to 10° to the direction of the central axis.

Example 3

A filter element having hollow fiber membrane bundle was produced by static molding using a polyvinyl chloride insert having a shape shown in FIG. 2-g.

The insert was shaped from a polyvinyl chloride plate having a thickness of 5 mm, and each face was closed to have no opening. The insert had an end having a circular cross-section with an outer diameter of 20 mm and a cylindrical portion having an outer diameter of 75 mm and a length of 700 mm. The entire length of the insert was 800 mm. The apparent density of the insert was 0.35 g/cm$^3$. The apparent density was determined as in Example 1 except that the volume was measured by directly immersing the insert in water without use of a polyethylene bag.

This insert was used, and components for a hollow fiber membrane filter element were set on a casting jig as in Example 1. The casting jig was erected such that the upper head was located downside, and the casting material cup of the upper head was connected to the casting material pot 11 with an injection hose. In the casting material pot 11, a mixture of two liquid urethane resin component was fed. Then, the resin mixture was injected in the upper head over 5 minutes by pressurizing the cast material pot 11 with air and then was left for 120 minutes. After that, as in Example 1, a filter element having hollow fiber membrane bundle with a fixed end was produced.

Then, the whole, including the casting jig, was inverted, and the lower ring side was bonded. The casting material pot and the lower ring were connected with an injection hose. In the casting material pot 11, a mixture of two liquid urethane resin component was fed. Then, the resin mixture was injected in the fixing portion-forming region of the lower ring over 5 minutes by pressurizing the cast material pot 11 with air and then was left for 120 minutes.

Careful observation of the hollow fiber membrane bundle confirmed no defect in the hollow fiber membranes after the drawing out of the insert. In addition, no trace of the insert dented in the end fixing portion was found.

Then, the resulting filter element was aerated in water as in Example 1, and the conditions of the membranes were observed. The fed air vibrated each hollow fiber membrane without dissipation near the end fixing portion at the lower ring and moved to the upper portion of the hollow fiber membrane bundle. It was confirmed that the air sufficiently agitated the water surrounding the hollow fiber membrane bundle.

Furthermore, the cross section of the end fixing portion of the hollow fiber membrane bundle was observed as follows:

First, the end fixing portion 4 at the upper head of the hollow fiber membrane bundle was equally cut into four in the axis direction and was observed the casting material present between the hollow fiber membranes in the end fixing portion 4 of each cross section. In a cross section of the filter element at the inner side, two defect portions of not having the casting material were observed in hollow fiber membrane sub-bundles, but the casting material was present in other portions and no defects was observed.

Then, as in Example 1, the distribution of the hollow fiber membranes in the end fixing portion was observed. First, a positional relation between the through-holes and the hollow fiber membranes was visually observed. All of the through-holes 6 were present inside the hollow fiber membrane bundle. Furthermore, the ends of the hollow fiber membranes were present between all the through-holes 6.

Then, the fixing region was divided into three segments as in Example 1 except that a point of the lower ring-fixing portion at the lower side when components of the hollow fiber membrane filter element were set on a casting jig was defined as a point P1, and the proportion of the membrane filling rate in each segment was calculated. [FA/FB] was 1.1, and [FA/FC] was 1.1.

Furthermore, the end fixing portion at the lower ring of the hollow fiber membrane bundle was cut along the central axis, and the interface was observed. Ninety percent or more of the hollow fiber membranes were fixed approximately parallel to each other at an angle of 0 to 10° to the direction of the central axis.

Example 4

A filter element having hollow fiber membrane bundle was produced by the centrifugal molding using an insert having a shape shown in FIG. 2-g.

The insert was shaped from a polyethylene plate having a thickness of 2 mm to the same shape as that of the insert in Example 3. The apparent density of the insert was 0.10 g/cm$^3$. The apparent density was determined as in Example 1 except that the volume was measured by directly immersing the insert in water without use of a polyethylene bag.

A filter element having hollow fiber membrane bundle was produced as in Example 1 using this insert, and was evaluated. There was no occurrence of defects in the hollow fiber membranes after the drawing out of the insert. In addition, there was no trace of the insert dented in the end fixing portion. Furthermore, the observation of the bottom face of the lower ring confirmed that all of the through-holes 6 were present inside the hollow fiber membrane bundle.

Then, the resulting filter element was aerated in water as in Example 1, and the conditions of the membranes were observed. The fed air vibrated each hollow fiber membrane without dissipation near the end fixing portion at the lower ring and moved to the upper portion of the hollow fiber membrane bundle. It was confirmed that the air sufficiently agitated the water surrounding the hollow fiber membrane bundle.

Furthermore, a filtration test was carried out as in Example 1. The transmembrane pressure was −15 to −20 kPa and was stable for three months. After three months, the weight of sludge and foreign substances adhering to the hollow fiber membranes was 3.2 kg.

Then, the cross section of the end fixing portion of the hollow fiber membrane bundle was observed as follows: First, the end fixing portion 4 at the upper head of the hollow fiber membrane bundle was equally divided into four in the length direction of the membrane and was observed the casting material present between the hollow fiber membranes in each cross section. The casting material was present in every cross section and there was no defect portion.

Then, as in Example 1, the distribution of the hollow fiber membranes in the end fixing portion was observed. First, a positional relation between the through-holes and the hollow fiber membranes was visually observed. All of the through-holes 6 were present inside the hollow fiber membrane bundle. Furthermore, the ends of the hollow fiber membranes were present between all the through-holes 6.

Then, the fixing region was divided into three segments as in Example 1, and the proportion of the membrane filling rate in each segment was calculated. [FA/FB] was 1.1, and [FA/FC] was 1.0.

Furthermore, the end fixing portion at the lower ring of the hollow fiber membrane bundle was cut along the central axis, and the interface was observed. Ninety percent or more of the hollow fiber membranes were fixed approximately parallel to each other at an angle of 0 to 10° to the direction of the central axis.

Example 5

A filter element having hollow fiber membrane bundles was produced by the centrifugal molding using an insert having a shape shown in FIG. 2-g.

The insert was shaped from a polyvinyl chloride plate having a thickness of 3 mm into the same shape as that of the insert in Example 3. The apparent density of the insert was 0.22 g/cm$^3$. The apparent density was determined as in Example 1 except that the volume was measured by directly immersing the insert in water without use of a polyethylene bag.

A filter element having hollow fiber membrane bundle was produced as in Example 1 using this insert, and was evaluated. There was no occurrence of defects in the hollow fiber membranes after the drawing out of the insert. Though the insert moved toward the end fixing portion 4 at the upper head by about 30 mm, there was no trace of the insert dented in the end fixing portion.

Then, the resulting filter element was aerated in water as in Example 1, and the conditions of the membranes were observed. The fed air vibrated each hollow fiber membrane without dissipation near the end fixing portion at the lower ring and moved to the upper portion of the hollow fiber membrane bundle. It was confirmed that the air sufficiently agitated the water surrounding the hollow fiber membrane bundles. However, a group of large air bubbles ascending from the center of the hollow fiber membrane bundle was observed.

Furthermore, a filtration test was carried out as in Example 1. The transmembrane pressure was −15 to −40 kPa and was stable for three months. After three months, the weight of sludge and foreign substances adhering to the hollow fiber membranes was 4.2 kg.

Then, the cross section of the end fixing portion of the hollow fiber membrane bundle was observed as follows: First, the end fixing portion 4 at the upper head of the hollow fiber membrane bundle was equally divided into four in the length direction of the membrane and was observed the casting material present between the hollow fiber membranes in each cross section. The casting material was present in every cross section and there was no defect portion.

Then, as in Example 1, the distribution of the hollow fiber membranes in the end fixing portion was observed. First, a positional relation between the through-holes and the hollow fiber membranes was visually observed. All of the through-holes 6 were present inside the hollow fiber membrane bundle. However, there was a portion where almost no hollow fiber membranes were present at the center of the end of the hollow fiber membrane bundle, and three through-holes 6 were present in this portion.

Then, the fixing region was divided into three segments as in Example 1, and the proportion of the membrane filling rate in each segment was calculated. [FA/FB] was 1.8, and [FA/FC] was 1.1.

Furthermore, the end fixing portion at the lower ring of the hollow fiber membrane bundle was cut along the central axis, and the interface was observed. Ninety percent or more of the hollow fiber membranes were fixed approximately parallel to each other at an angle of 0 to 10° to the direction of the central axis.

Example 6

A filter element having hollow fiber membrane bundle was produced by static molding using a vulcanized rubber insert having the same shape as that of the insert used in Example 2. The insert was filled with a 35 wt % ethanol aqueous solution and was sealed. The apparent density of the insert was 0.95 g/cm$^3$.

A hollow fiber membrane bundle and a filter element were produced using this insert as in Example 3 and were evaluated. There was no occurrence of defects in the hollow fiber membranes after the drawing out of the insert. Though the insert moved toward the end fixing portion 4 at the upper head by about 20 mm, there was no trace of the insert dented in the end fixing portion.

Then, the resulting filter element was aerated in water as in Example 1, and the conditions of the membranes were observed. The fed air vibrated each hollow fiber membrane without dissipation near the end fixing portion at the lower ring and moved to the upper portion of the hollow fiber membrane bundle. It was confirmed that the air sufficiently agitated the water surrounding the hollow fiber membrane bundle. However, a group of large air bubbles ascending from the center of the hollow fiber membrane bundle was observed.

Furthermore, a filtration test was carried out as in Example 1. The transmembrane pressure was −15 to −45 kPa and was stable for three months. After three months, the weight of sludge and foreign substances adhering to the hollow fiber membranes was 4.4 kg.

Then, the cross section of the end fixing portion of the hollow fiber membrane bundle was observed as follows: First, the end fixing portion 4 at the upper head of the hollow fiber membrane bundle was equally divided into four in the length direction of the membrane and was observed the casting material present between the hollow fiber membranes in each cross section. The casting material was present in every cross section and there was no defect portion.

Then, as in Example 1, the distribution of the hollow fiber membranes in the end fixing portion was observed. First, a positional relation between the through-holes and the hollow fiber membranes was visually observed. All of the through-holes 6 were present inside the hollow fiber membrane bundle. However, there was a portion where almost no hollow fiber membranes were present at the center of the end of the hollow fiber membrane bundle, and three through-holes 6 were present in this portion.

Then, the fixing region was divided into three segments as in Example 1, and the proportion of the membrane filling rate in each segment was calculated. [FA/FB] was 2.1, and [FA/FC] was 1.2.

Furthermore, the end fixing portion at the lower ring of the hollow fiber membrane bundle was cut along the central axis, and the interface was observed. Ninety percent or more of the hollow fiber membranes were fixed approximately parallel to each other at an angle of 0 to 100 to the direction of the central axis.

Example 7

A filter element including hollow fiber membrane bundle having an end fixed by centrifugal molding using two water-soluble inserts each having an ellipsoidal cross-section was produced. The inserts were formed by molding a paste prepared by adding a carboxymethylcellulose aqueous solution to soluble starch and drying it and were a porous material having a porosity of 70%. The shape of the cross section was an ellipse with a minor axis outer diameter of 40 mm and a minor axis inner diameter of 30 mm, a major axis outer diameter of 100 mm, and a major axis inner diameter of 90 mm, and the entire length of each insert was 850 mm. The apparent density of the insert was 0.09 g/cm$^3$. The apparent density was measured as in Example 1.

Figure 4:
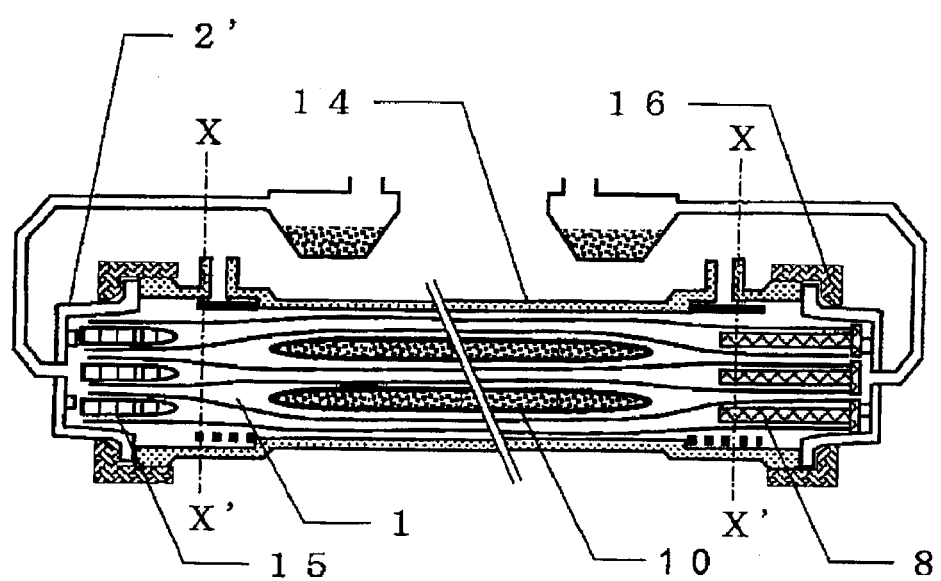
FIG. 4 is an explanatory diagram of another embodiment of the method for forming a fixing portion of a hollow fiber membrane filter element bundle.

The filter element including hollow fiber membrane bundle having a fixed end was produced using the above-mentioned inserts as described below. FIG. 4 is a conceptual diagram illustrating a method of forming the fixing portion.

One thousand five hundred sixty polyvinylidene fluoride microfiltration membranes having a micropore diameter of 0.1 μm, an outer diameter of 1.2 mm, an inner diameter of 0.6 mm, and a length of 1180 mm were used.

The hollow fiber membranes were sealed by 5 mm from the ends, and then the membranes were divided into unbound three bunches, with rubber bands, each including 520 membranes. One of these hollow fiber membrane bunches was horizontally put on a high-density polyethylene film, and one of the above-mentioned inserts was put thereon. Then, another hollow fiber membrane bunch was put thereon, and the other insert was put thereon. Furthermore, the remaining hollow fiber membrane bunch was put thereon. The two inserts were disposed at the center of the length direction of the hollow fiber membrane. That is, the inserts were disposed such that their ends were in the end fixing portion-forming region, i.e., a position 70 mm from the X-X' lines in FIG. 4. In addition, the hollow fiber membranes were evenly disposed around the inserts such that the inserts were not exposed to the exterior.

Then, the hollow fiber membrane bundle including the inserts was wrapped with a high-density polyethylene film, and both ends were fixed with a tape. The wrapped hollow fiber membrane bundle was put in an ABS external cylinder 14 having a diameter of 152 mm and a length of 1120 mm. Then, the tape at both ends was removed and the high-density polyethylene film was drawn out.

Then, 48 polyurethane resin bars 15 each having an outer diameter of 14 mm and a length of 80 mm were inserted in the hollow fiber membrane bundle at the occluded end, and the hollow fiber membrane bundle was fixed by winding a tape onto the circumference near this end. The resin bars were disposed in the hollow fiber membrane bundle with equal intervals.

Furthermore, 24 polyethylene through-hole-forming pins having an outer diameter of 11 mm and a length of 120 mm and 32 the same resin bars as above were inserted in the end with open hollow portions, and the hollow fiber membrane bundle was fixed by winding a tape onto the circumference near this end. The through-hole-forming pins that each have a disk of 15 mm diameter at one end and have a diameter of 11 mm and a length of 120 mm and the resin bars that have an outer diameter of 14 mm and a length of 80 mm were disposed such that the hollow fiber membranes were evenly distributed and the through-hole-forming pins were disposed in the hollow fiber membrane bundle with equal intervals.

Then, casting material cups 2' each having a depth of 35 mm were abutted on the both end faces of the external cylinder and were hermetically fixed to the external cylinder with nuts 16. Then, the external cylinder provided with the casting material cups was set to a centrifugal molding rack (not shown).

Casting material pots 11 placed on the centrifugal molding rack and the casting material cups 2' were connected with injecting hoses 12. In the casting material pots 11, a mixture of two liquid urethane resin component was fed. Then, the centrifugal molding rack was rotated at a rate of 250 rpm to apply a centrifugal force of 35 G to the end fixing portion-forming regions. After 90 minutes, the rotation was stopped, and the hollow fiber membrane bundle contained in the external cylinder and having the fixed ends was dismounted from the centrifugal molding rack. The hollow fiber membrane bundle was heated at 50° C. for 24 hours in a desiccator. Then, the casting material cups 2' were detached, and the hollow portions at the preliminary occluded end of the hollow fiber membranes were opened by cutting about 35 mm of the membranes protruding from the external cylinder.

Then, the through-hole-forming pins 8 were drawn out to form through-holes 6 each having a diameter of 11 mm (hereinafter, the side having open hollow portions is referred to as a permeation side, and the side having the through-holes is referred to as a raw-water side). Caps for connecting piping of a filter device were attached to both end faces of the hollow fiber membrane filter element. The filter element was connected to the filter device with the caps, and the inserts were dissolved and removed by applying hot water of 70° C. from the raw-water side.

As a result, hollow fiber membrane bundle having both ends fixed with a casting material and a filter element including the same were obtained. The effective length of the filtration portion between the interfaces of the end fixing portions was 990 mm; the membrane area was 6 m$^2$; and the end fixing portions each had a diameter of 152 mm, a length of 65 mm, and a hollow fiber membrane filling rate of 10% at the interface of the end fixing portion.

Then, the resulting filter element was aerated in water as in Example 1, and the conditions of the membranes were observed. The fed air vibrated each hollow fiber membrane without dissipation near the end fixing portion at the lower ring and moved to the upper portion of the hollow fiber membrane bundle. It was confirmed that the air sufficiently agitated the water surrounding the hollow fiber membrane bundles. However, a group of large air bubbles ascending from the center of the hollow fiber membrane bundle was observed.

Furthermore, the cross sections of the end fixing portions of the hollow fiber membrane bundle were observed as follows:

First, the end fixing portion 4 at the permeation side of the hollow fiber membrane bundle was equally cut into four in the length direction of the membrane and was observed the casting material present between the hollow fiber membranes in each cross section. The casting material was observed in all cross sections, and no defect was found.

Then, the distribution of the hollow fiber membranes in the end fixing portion at the raw-water side was observed as in Example 1. First, a positional relation between the through-holes and the hollow fiber membranes was visually observed. All of the through-holes 6 were present inside the hollow fiber membrane bundle. Furthermore, the hollow fiber membrane bundle was present between all the through-holes 6.

Then, the fixing region was divided into three segments as in Example 1, and the proportion of the membrane filling rate in each segment was calculated. [FA/FB] was 1.0, and [FA/FC] was 1.1.

Then, the end fixing portion at the lower ring of the hollow fiber membrane bundle was cut along the central axis, and the interface was observed. Ninety percent or more of the hollow fiber membranes were fixed approximately parallel to each other at an angle of 0 to 10° to the direction of the central axis.

Comparative Example 1

A hollow fiber membrane bundle and a hollow fiber membrane filter element were produced as in Example 1 except that the centrifugal molding was carried out without disposing the cylindrical insert at the lower ring side.

The filter element was aerated in a water tank as in Example 1, and the conditions of the membranes were observed. The fed air dissipated from the end fixing portion at the lower ring, and the effect of shaking of the hollow fiber membranes and the effect of agitation due to movement of the air to the upper portion of the hollow fiber membranes was not confirmed.

A filtration test was carried out as in Example 1. After two weeks, the operation was halted because of a transmembrane pressure exceeding −60 kPa.

Then, the cross section of the end fixing portion of the hollow fiber membrane bundle was observed as follows:

First, the end fixing portion 4 at the upper head of the hollow fiber membrane bundle was equally divided into four in the length direction of the membrane, and the casting material present between the hollow fiber membranes in each cross section was observed. The casting material was present in every cross section and there was no defect portion.

Then, as in Example 1, the distribution of the hollow fiber membranes in the end fixing portion at the lower ring was observed. First, a positional relation between the through-holes and the hollow fiber membranes was visually observed. The hollow fiber membranes gathered in one side, and a portion where the hollow fiber membranes were rarely present was observed in the opposite side. Eight through-holes were present in the portion where the hollow fiber membranes were rarely present, and no hollow fiber membranes were present between five through-holes 6 among the eight through-holes 6.

Then, the fixing region was divided into three segments as in Example 1, and the proportion of the membrane filling rate in each segment was calculated. [FA/FB] was 1.3, and [FA/FC] was 9.1.

Furthermore, the end fixing portion of the lower ring of the hollow fiber membrane bundle was cut along the central axis, and the interface was observed. Thirty percent or more of the hollow fiber membranes were inclined at an angle of 10 to 30° to the central axis.

INDUSTRIAL APPLICABILITY

According to the method of the present invention, a hollow fiber membrane bundle having hollow fiber membranes evenly distributed in the end fixing portion and a fixed end can be readily produced even at a low membrane filling rate. Therefore, the resulting hollow fiber membrane bundle can be efficiently used in general membrane filtration and also as a hollow fiber membrane filter element, particularly, used in a membrane separation activated sludge process.

The invention claimed is:

1. A method of producing a hollow fiber membrane bundle having fixed ends, comprising placing an insert having an apparent density of 0.1 g/cm$^3$ or less inside a hollow fiber membrane bundle at a position inner than a region to be fixed; fixing the ends of the hollow fiber membranes; and removing the insert from the inside of the hollow fiber membrane bundle, wherein the inset is a foam.

2. A method of producing a hollow fiber membrane bundle having fixed ends, comprising placing an insert having an apparent density of 0.1 g/cm$^3$ or less inside a hollow fiber membrane bundle at a position inner than a region to be fixed; fixing the ends of the hollow fiber membranes; and removing the insert from the inside of the hollow fiber membrane bundle, wherein the insert is a balloon inflated with a gas and/or a liquid.

3. The method according to claim 1 or 2, wherein the insert has a shape of a sphere, a cylinder, or a polygonal column.

4. The method according to claim 1 or 2, wherein the insert has a shape of which a cross-section perpendicular to a major axis thereof is circular, ellipsoidal, or polygonal and has a circle-equivalent diameter decreasing from a center toward one or both ends of the insert along the major axis.

5. The method according to claim 1 or 2, wherein the insert is made from a thermoplastic resin or rubber.

6. The method according to claim 1 or 2, wherein one of the fixed ends of the hollow fiber membranes has through-holes formed therein on one side.

7. The method according to claim 1 or 2, wherein a membrane filling rate at an interface inner than the end fixing portion of the hollow fiber membranes is in the range of 5 to 40%.

8. The method according to claim 1 or 2, wherein the ends of the hollow fiber membranes are fixed by injecting a casting material in the ends of the hollow fiber membranes by a centrifugal force and hardening the casting material; and then removing the insert from the inside of the hollow fiber membrane bundle.

9. The method according to claim 1 or 2, including the step of disposing the hollow fiber membrane bundle in a surrounding member or an external cylinder before fixing the ends of the hollow fiber membranes.

* * * * *